T 867013

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1093

687,103

HEAT-STABLE ULTRAVIOLET-UNSTABLE ETHYLENE-CARBON MONOXIDE COPOLYMERS

Robert L. Combs, Max F. Meyer, Jr., and Harry W. Coover, Jr., all of P.O. Box 511, Kingsport, Tenn. 37662

Filed Dec. 1, 1967. Published Oct. 28, 1969
Int. Cl. C08f *25/00, 1/60*
U.S. Cl. 260—94.9
No Drawing. 14 Pages Specification

Heat-stable, ultraviolet light-unstable copolymer of ethylene and carbon monoxide, said copolymer having a carbon monoxide content of about 7 to 29 mole percent, an inherent viscosity of about 0.4 to 1.8 and a melt index of about 0.1 to 100.